Nov. 26, 1968 W. HOLZER 3,412,617

DRIVE DEVICE

Filed March 22, 1966 2 Sheets-Sheet 1

Nov. 26, 1968   W. HOLZER   3,412,617

DRIVE DEVICE

Filed March 22, 1966   2 Sheets-Sheet 2

United States Patent Office

3,412,617
Patented Nov. 26, 1968

3,412,617
DRIVE DEVICE
Walter Holzer, Meersburg (Bodensee),
Schutzenrain, Germany
Filed Mar. 22, 1966, Ser. No. 536,399
Claims priority, application Germany, Apr. 8, 1965,
H 55,800
10 Claims. (Cl. 74—3.54)

ABSTRACT OF THE DISCLOSURE

A drive device suitable for purposes such as program control of appliances. The device has a continuously windable spring force storage means to which a continuous winding-up system is connected, this spring force storage means being coupled to a stepping mechanism which is acted upon by a run-down brake. This brake is controlled by the continuous winding-up system for the spring force storage means.

---

The present invention relates to a drive device, for example for pragramme control of appliances such as washing machines, having a continuously windable spring force storage means, a stepping mechanism and a run-down brake.

It is the object of the invention to provide a simple stepwise drive device with a high functional efficiency and long working life.

In the case of conventional stepwise drive devices, the actual step time, that is to say the time required to transfer from one state of inertia to another, is generally of extremely short duration. Consequently, very high surge accelerations occur, so that vibration and deformation of the moving parts by force are inevitable.

Thus, stepwise drives having a jump mechanism and a retarding mechanism are known, in which the retarding mechanism is formed by an eccentric cam continuously moved by the driving motor of the jump mechanism, the aforesaid cam moving a locking part with projections which thus strike against shoulders spaced at the step intervals. This happens with a more or less violent impact, so that the shoulders and the projections are rapidly worn and the functional reliability is correspondingly reduced. To a certain extent, the drive pinion or its mounting also have to absorb the shocks so that considerable wear occurs at these places.

Drive devices are also known which serve for example for the stepwise rotary movement of a control disc, of which the concentric cam paths intermittently shift a number of spring-loaded contact levers arranged in groups. The drive device must function sufficiently accurately and precisely for even the minimum rotary movements of the control disc to be sufficient abruptly to move the many contact arms which are in contact with the control disc. For this purpose, it has been proposed to use a drive pinion having detent elements which press resiliently against the control disc and engage lockingly in the teeth thereon. With this design, the drive must be disposed with the driven control disc on a common very accurately made baseplate, or the two devices must be mounted in bearings and adapted to pivot towards each other, it being possible accurately to maintain the distance between them.

It is the object of the invention to avoid these disadvantages and to provide a device which is suitable for the stepwise feeding of rotating parts, is of simple construction, cheap to manufacture and free from overload due to surges of rotary acceleration.

This problem is resolved according to the invention by a drive device, for example for programme controlling of appliances such as washing machines, having a continuously windable spring force storage means, a stepping mechanism and a run-down brake, acting on the stepping mechanism and controllable by the continuous winding system for the spring force storage means.

In such an arrangement, the cycle of the stepping mechanism is braked, the necessary controlling energy being supplied not by the spring force storage itself but by the drive motor, through the continuous winding system. The duration of the stepping time is thus somewhat increased, which is of advantage in many applications, and acceleration surges are virtually entirely eliminated. Consequently, the stepping movement is performed as an even changeover with no jerks or jolts.

One embodiment of the invention is characterized in that the run-down brake is constructed as a lever escapement mechanism controllable for example by an eccentric of the winding system for the spring force storage means.

In this respect, it is advantageous if the eccentric-operated arm of the swinging lever is spring-loaded. The stepping mechanism driven by the spring force storage means is therefore braked by the swinging lever, the movement of this latter being controlled not by the spring force storage means but by the common continuous drive. This means that it is possible for the spring force storage means to be correspondingly weaker.

In a further embodiment of the invention, the run-down brake takes the form of an override clutch.

In this case, the basic idea resides in the rotary movement performed by the driving element of the stepping mechanism to be conveyed back to the continuous drive which, in this way, also assumes the function of the run-down brake. Therefore, a very powerful motor must be provided which has to absorb the accelerations retroactive on the drive side through a geared return. The essential feature here is that the override clutch brakes the stepwise element as soon as its speed of rotation becomes greater than that of the controlling wheel of the continuous drive.

In a further embodiment of the invention, it is envisaged that the override clutch is connected on the one hand to the drive element of the stepping mechanism and on the other to a control disc driven by the winding system of the spring force storage means.

The control disc which is therefore not driven by the spring force storage means itself but by its winding system and on which one end of the override clutch engages, requires only a little energy to control it. A great advantage of the arrangement according to the invention resides in that the energy which moves the spring force storage means acts immediately on the stepping mechanism but in a weakened form. Since the abrupt rotary acceleration arising here is absorbed by the run-down brake, i.e., the override clutch, there is no additional wear and tear of the continuous drive of any gear transmission which may be needed or of the mountings.

An important feature of the invention resides in that a coil spring serves as the override clutch, the said coil spring engaging over a cylindrical part of the drive element and, flush in line therewith, a cylindrical part of the spring force storage means and being attached to the control disc.

For this reason, an immediate coupling of the spring force storage means to the stepwise-driven element is achieved, only very slight controlling forces being needed to release or engage the coupling. If, immediately after the release of a lock of the spring force storage means, its released movement energy becomes very great, then the stepwise-driven element is set in motion while the override clutch is slackened somewhat immediately. The abatement of movement energy and the fact that the stepwise-driven element is now in motion, result straightaway in a renewed engagement of the clutch and a further movement of the stepwise-driven element. In other words, a kind of equilibrium is established until the energy of the spring force storage means is used and the step movement is completed.

An essential factor is that the direction in which the coil spring is wound should agree with the direction of rotation of the control disc and of the driven element.

Use is made here of the well known principle that a smooth revolving part entrains a rope loosely placed on its as soon as a load is applied and so long as the loop angle is sufficiently large. Such arrangements are conventional for example in the case of rope winches, for example in marine applications. The use of a correspondingly shaped coil spring is particularly advantageous with stepwise drive devices and permits of both simple and effective braking of the acceleration surges which arise.

It is also very expedient for the control disc to be mounted on one of the cylindrical members.

It can therefore be very easily disposed between the spring force storage means and the stepping mechanism, thus saving on additional components. The slowly rotating control disc, on which one end of the coil spring is anchored, gradually brakes the driven elements when the spring force storage means is released. By frictional contact, therefore, the driven element itself holds the coil spring on its cylindrical part if it is driven by the spring force storage means more rapidly than the control disc.

Very expedient, too, is a further embodiment in which fewer turns of the coil spring engage on the cylindrical part of the spring force storage means than on the cylindrical part of the stepwise-driven element.

This measure achieves a particularly steady progress of the stepping movement. The effect is obviously based on the fact that the force or torque at the free end of the coil spring must always be equal to nil so that the coil spring can slip, whereas the anchoring of the other end of the coil spring to the control disc means that a force or torque other than nil is always present, which tends to wind up, i.e., tense the coil spring. However, since the cylindrical part of the spring force storage means, after it has been released, initially acts in the same way, too, it is advantageous for the equalization of forces to shorten the length of turns somewhat on this cylindrical part.

There are various possible ways of constructing the stepping mechanism. It is particularly suitable for the driven element to be a pinion, for example, a pinion with two dogs, the movement of which is released or prevented by an escapement with stops.

One arrangement which is very simple and inexpensive to produce and assemble consists for example of a disc connected to the stepwise-driven element and having guideways consisting for example of upwardly bent stamped parts, sliding on stops on a reciprocating plate.

A further feature of the invention consists in that the stops for the driven element and the lock of the spring force storage means are made in one piece and are actuated by an eccentric coaxial with the spring force storage means.

This measure saves a further component and results in utmost utilization of the available space. Such drive devices can therefore be produced to have very small overall dimensions.

While the invention has been explained hereinbefore essentially with reference to an arrangement employing toothed wheels and wheel mechanisms, it is of course also possible, for certain applications, to provide friction-wheel drive elements and the like. Likewise, countless structural modifications are possible whtiout departing from the basic idea of the invention. Applications of the invention can therefore be said to be all possibilities of disposing an elastic intermediate member between a spring force storage means and the element of a stepping mechanism which it drives, in such a way that any acceleration surges arising are absorbed and/or attenuated. It is quite possible, easily to control the moment of release of the spring force storage means very accurately, while the duration of the step is somewhat increased by the action of the run-down brake. This is, however, particularly advantageous because, with the conventional actuation of stepping mechanisms by a continuously moved eccentric cam, this latter travels the shortest distance in relation to its angular speed at the actual releasing point. Such drives are therefore generally unsuitable for accurate control, as compared with the drive device according to the invention, which can be tripped very accurately. Even so, it is composed of a few simple components which are cheap to produce and easy to adjust. Correspondingly, it offers high functional reliability and a long working life.

Further features of the invention will become manifest from the ensuing description of embodiments of the invention which are explained with reference to the appended drawings, in which.

Figure 1:
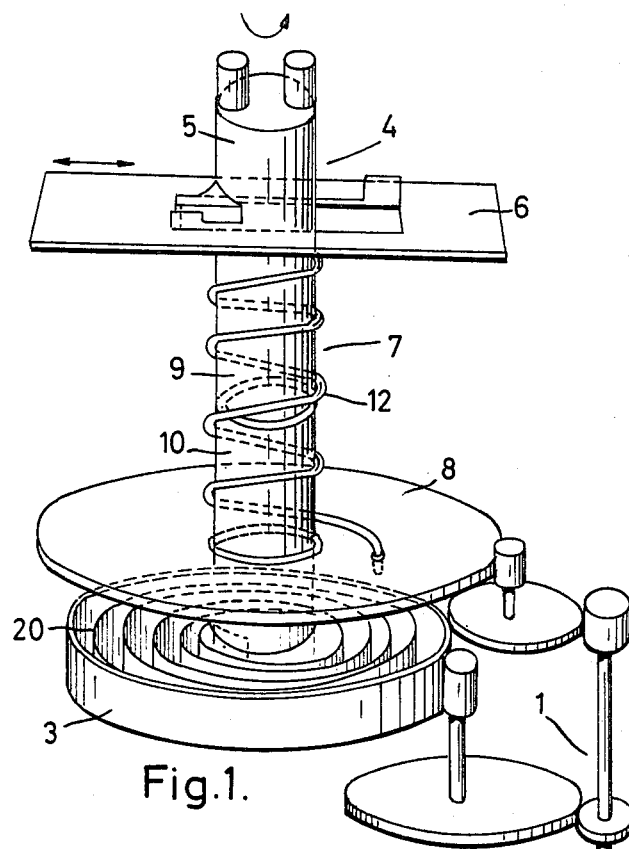
FIG. 1 illustrates the principle of construction of the drive device according to the invention.

FIG. 1 shows in a diagrammatic perspective view the construction of the drive device according to the invention, showing its essential component parts. The illustration shows a continuous drive 1 which consists of a set of wheels and a motor 2 which continually winds up a spring force storage means 3. The spring force storage means 3 is coupled with a stepping mechanism 4 which consists of a stepwise-driven element 5 and an escapement mechanism 6 by which the movement of the stepwise-driven element 5 is released or blocked after every half or full revolution of the spring force storage means. The speed of progress of this stepwise-driven element 5 is determined by a brake 7 which can be of any desired known form. In the illustration in FIG. 1, the brake 7 is constructed as an override clutch 12 which is detachably connected, namely by frictional contact, to the cylindrical part 9 of the stepwise-driven element 5 and the cylindrical part 10 of the spring force storage means 3. The cylindrical part 10 of the spring force storage means 3 is connected to the inner end of a spirally wound flat spring 20, the outer end of which is attached to the periphery of the spring force storage means 3, on the cylindrical part 10 of which is also mounted a control disc 8 which is driven by the continuous drive 1 with considerable reduction and is connected to one part of the override clutch 12.

The device functions in the following way: the spring force storage means 3, after it has been released by a detent means, not shown here for reasons of clarity, moves the cylindrical part 10 and, by virtue of the initially present frictional contact, also the cylindrical part 9. If part 10 rotates, however, more rapidly than part 9, then the override clutch 12 acts, eliminating the frictional contact so that part 9 is no longer driven. The continuously revolving control disc 8, however, ensures that the override clutch 12 is again tensed, so that frictional contact is restored and part 5 is driven, by the energy of the spring force storage means 3. This interplay is repeated and rapidly leads to a kind of equilibrium, until the movement energy of the spring force storage means 3 has been used up and the stepwise-driven element 5 has come to a standstill.

Figure 2:
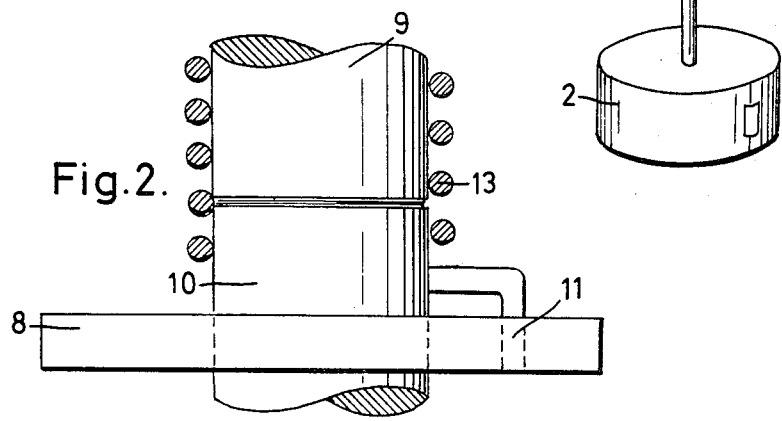
FIG. 2 is a cross section through a run-down brake constructed as an override clutch.

The cross-sectional view shown in FIG. 2 illustrates the transmission of force or torque by the override clutch 7 which is constructed as a coil spring 13. It will be seen that the coil spring 13 has a greater number of turns on the cylindrical part 9 of the stepwise-driven element 5 and only a few turns on the cylindrical part 10 of the spring force storage means 3. The upper end of the coil spring 13 is left free, i.e., it exerts nil force or torque, while the bottom end of the coil spring 13 is anchored on the control disc 8 at 11. Thus, a force or torque is always present which, due to the fact that the coil spring 13 is wound in the same direction as the direction of rotation of the control disc 8, tends to tense the coil spring 13, thus restoring the frictional contact between parts 9 and 10, which was eliminated by the excessively fast movement of the spring force storage means 3 due to opening of the winding of coil spring 13.

Figure 3:
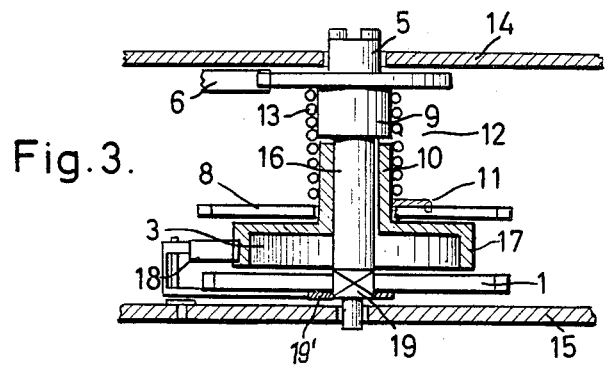
FIG. 3 is a drive device according to the invention, having a coil spring as the run-down brake.

The arrangement shown in FIG. 3 is a simple and space-savingly constructed drive device in which a continuous drive 1 acts through a clutch on the spring force storage means 3 which is prevented from running down by a detent 18 which may for example be integral with the escapement mechanism 6 for the stepwise-driven element 5. It can be actuated by an eccentric member 19′, coaxial with the spring force storage means 3. The cylindrical part 9 of the stepwise-driven element 5 ends in a spindle 16 on which is mounted the cylindrical part 10 of the housing 17 of the spring force storage means 3. The override clutch 12 again consists of a coil spring, one end of which is anchored at 11 on the control disc 8. The stepwise-driven element 5, which has two dogs on its end face is mounted in a plate 14 while the end 19 is mounted in the plate 15. The arrangement functions in the same way as that shown in FIG. 1, the wheel sets from the motor 2 to the continuous drive 1 and the control disc 8 not being shown, for the sake of clarity. Since the direction of the turns of the coil spring 13 agrees with the direction of rotation of the stepwise-driven element 5, all movements follow the same direction of rotation. Frictional contact occurs only on smooth surfaces. Due to this fact, there is only minimum wear and tear, i.e., the movement energy absorbed by the run-down brake is converted almost entirely into heat.

The spring force storage means housing can also be combined with the drive gearwheel of the continuous drive 1 and the aforesaid eccentric 19. This further simplifies the design of the device whereas, as previously, exactly timed releasing or blocking of the step movement is possible, terminating for example by the striking of a cam on the stepwise-driven element 5.

Figure 4:
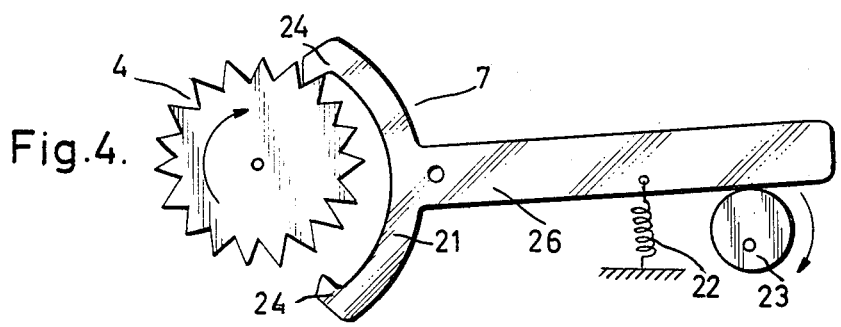
FIG. 4 is an arrangement employing a lever escapement mechanism.

In the embodiment shown in FIG. 4, the stepping mechanism 4 is shown in a plan view, the run-down brake 7 being a pivotally mounted swinging lever 21 with claws 24 which alternately engage in the teeth of a gearwheel of the stepping mechanism 4. The swinging lever 21 has an arm 26 which is biased to one side by a spring 22. The arm is therefore permanently resting on an eccentric member 23 which is driven by the continuous drive 1. In this case, too, the energy to control the run-down brake 7 is furnished not by the spring force storage means 3 but by the common continuous drive 1, which is not shown in the drawing, for the sake of clarity.

Figure 5:
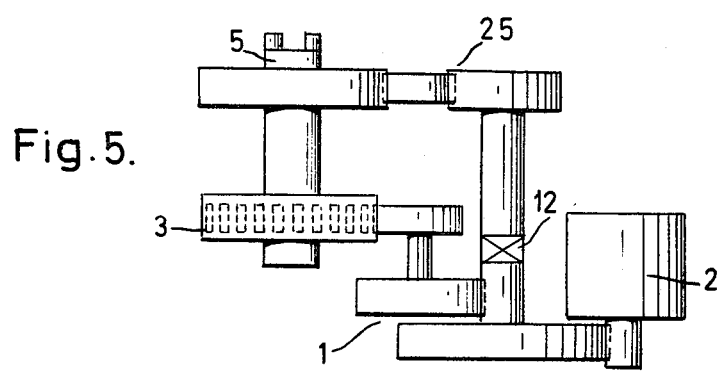
FIG. 5 is an embodiment with a geared return to the drive.

FIG. 5 shows another embodiment of the invention in which the drive device again consists of a continuous drive 1 with a motor 2 and a spring force storage means 3 which drives the stepwise-driven element 5. For the sake of clarity, the detent elements have not been shown. The stepwise-driven element 5 is connected through a back gearing 25 and an override clutch 12 with the drive side, so that the additional rotary accelerations of the stepwise-driven element 5 are absorbed by the gears and the motor itself. It can be particularly advantageous for the back gearing 25 to be mounted on the spindles of the continuous drive 1, which would be required anyway. Since the fed back of the stepwise movement must follow the same direction of rotation, as the override clutch 12 would otherwise be blocked, it is necessary for the number of spindles of the back gearing 25 likewise to be the same as the number of spindles of the gearing in the continuous drive 1, although additional pairs of wheels may also be provided.

What is claimed is:
1. A drive device suitable for programme controls of appliances such as washing machines, having, in combination, a continuously windable spring force storage means, a continuous winding-up system for the spring force storage means, a stepping mechanism coupled to the spring force storage means, and a run-down brake, said run-down brake acting on the stepping mechanism and being controlled by the continuous wind-up system for the spring force storage means.

2. A drive device according to claim 1 wherein the run-down brake takes the form of a lever escapement mechanism controlled by an eccentric on the wind-up system for the spring force storage means.

3. A drive device according to claim 1, wherein the run-down brake is an override clutch.

4. A drive device according to claim 3 wherein the stepping mechanism has a driven element, and said winding-up system of the spring force storage means drives a control disc, said override clutch being connected at one end of the driven element of the stepping mechanism and at the other end to said control disc.

5. A drive device according to claim 4 wherein the override clutch is a coil spring which engages over a cylindrical part of the driven element and, flush in line therewith, a cylindrical part of the spring force storage means, said coil spring being attached to the control disc.

6. A drive device according to claim 5 wherein the direction in which the coil spring is wound is the same as the direction of rotation of the control disc and of the driven element.

7. A drive device according to claim 5 wherein the control disc is mounted on one of the cylindrical parts.

8. A drive device according to claim 5 where in fewer turns of the coil spring engage on the cylindrical part of the spring force storage means than engage on the cylindrical part of the driven element.

9. A drive device according to claim 1 wherein the driven element is constructed as a pinion.

10. A drive device according to claim 9 wherein the stops for the driven element and the detent of the spring force storage means are constructed in one piece and are adapted to be actuated by an eccentric coaxial with the spring force storage means.

References Cited
UNITED STATES PATENTS

| | | | |
|---|---|---|---|
| 2,061,827 | 11/1936 | Brooks. | |
| 2,607,413 | 8/1952 | Kinney et al. | 74—3.54 |
| 2,639,657 | 5/1953 | Lawson | 74—3.54 |
| 3,021,512 | 2/1962 | Welsh et al. | |

FOREIGN PATENTS 610,967   10/1960   Italy.

FRED C. MATTERN, JR. *Primary Examiner.*

WESLEY S. RATLIFF, *Assistant Examiner.*